United States Patent [19]

Trepka

[11] 4,402,843

[45] Sep. 6, 1983

[54] VISCOSITY INDEX IMPROVERS WITH DISPERSANT PROPERTIES PREPARED BY REACTION OF LITHIATED HYDROGENATED COPOLYMERS WITH 4-SUBSTITUTED AMINOPYRIDINES

[75] Inventor: William J. Trepka, Bartlesville, Okla.

[73] Assignee: Phillips Petroleum Company, Bartlesville, Okla.

[21] Appl. No.: 314,296

[22] Filed: Oct. 23, 1981

[51] Int. Cl.$^3$ ...................... C10M 1/32; C08F 255/02
[52] U.S. Cl. ..................................... 252/50; 525/366; 525/375
[58] Field of Search ................... 252/50; 525/366, 375

[56] References Cited

U.S. PATENT DOCUMENTS

| | | | |
|---|---|---|---|
| 3,554,911 | 1/1971 | Schiff et al. ........................... | 252/59 |
| 3,772,196 | 11/1973 | St. Clair et al. ............... | 252/32.7 E |
| 4,085,055 | 4/1978 | Durand et al. ........................ | 252/50 |
| 4,145,298 | 3/1979 | Trepka ........................... | 252/51.5 A |
| 4,229,308 | 10/1980 | Brulet et al. ........................... | 252/47 |
| 4,238,202 | 12/1980 | Trepka et al. ........................... | 44/62 |

FOREIGN PATENT DOCUMENTS 2437417 4/1980 France .
2437418 4/1980 France .

OTHER PUBLICATIONS

94 C.A. 49989j.
Fessender Organic Chemistry (1979) pp. 249 and 760.

*Primary Examiner*—W. J. Shine

[57] ABSTRACT

Nitrogen-containing copolymers useful as viscosity index improvers with dispersing characteristics are prepared by the reaction of lithiated hydrogenated conjugated diene-monovinylarene copolymers with substituted aminopyridine.

34 Claims, No Drawings

VISCOSITY INDEX IMPROVERS WITH DISPERSANT PROPERTIES PREPARED BY REACTION OF LITHIATED HYDROGENATED COPOLYMERS WITH 4-SUBSTITUTED AMINOPYRIDINES

FIELD OF THE INVENTION

The invention relates to novel copolymers. The invention further relates to improved lubricating oils. The invention also pertains to lubricating oil additives.

BACKGROUND OF THE INVENTION

Mineral oil stocks are the prime source of lubricants for an almost endless list of applications. Nearly all of the lubricants are formulated with a variety of additives. Lubricant additives generally are defined simply as materials which enhance or impart desirable properties to a mineral-base oil. The high quality of modern lubricants results for the most part from the use of additives.

Lubricating oils and related hydraulic and transmission fluids for present day machinery, and particularly for present day internal-combustion engines and other uses contain a wide variety of additives. The additives usually are classified according to their intended function such as dispersant; oxidation, corrosion and rust inhibitor; viscosity-index (VI) improver; pour-point depressant; and antiwear agents, antifoam agents; and the like.

The advent of high speed automotive engines in particular, coupled with increased engine operating temperatures and increased complexity of antipollution devices associated with such engines, has resulted in substantial increases in additive quantities in automotive lubricating oils to meet a continuing demand for improved properties and results. The quantities of additives employed in some uses have been approaching quantities so large as to affect negatively the primary mission of the lubricating oil: to lubricate. Needed is a single additive which will provide a multiple function to satisfy at least some of the basic requirements of individual additives for lubricating and other oils now presently satisfied by a package of several additives. With such an additive, the quantity of overall additives employed in the lubricating oil potentially could be substantially reduced, permitting a single effective unit quantity to fulfill multiple requirements.

BRIEF SUMMARY OF THE INVENTION

I have discovered a new class of copolymers particularly useful in providing both viscosity index improver effects plus dispersant effects. These copolymers are the reaction product of a metalated (lithiated) hydrogenated conjugated diene-monovinylarene copolymer with a special class of 4-substituted aminopyridines as grafting agents.

These 4-substituted aminopyridines can be represented generically by

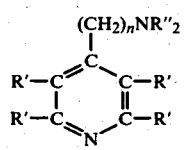

wherein each R' individually represents any of hydrogen, or hydrocarbonous aliphatic, cycloaliphatic, or aromatic radicals, or combinations thereof; each R" individually represents any of hydrocarbonous aliphatic, cycloaliphatic, or aromatic radicals, or combinations thereof; n is zero or a whole number of 1 to 6; such that R' (when other than hydrogen) and R" each contain 1 to 12 carbon atoms.

Typical but non-limiting examples of the substituted aminopyridines include:
4-dimethylaminopyridine, 4-diethylaminopyridine, 4-dipropylaminopyridine, 4-(N-dimethylaminomethyl)pyridine, 4-(N-diethylamino-methyl)pyridine, 4-(N-dimethylamino-ethyl)pyridine, and 4-(N-diethylamino-ethyl)pyridine. The presently preferred species is 4-dimethylaminopyridine.

These new copolymers provide outstanding viscosity index improvement plus acting as effective dispersants. Lubricating oils and related fluids containing my additives best are provided with the benefits of viscosity index improvers and sludge dispersants at one and the same time with a single additive.

DETAILED DESCRIPTION OF THE INVENTION

The copolymers which I have prepared, and which are employed in lubricating and other oil-based applications as additives to mineral base oils, synthetic oils, and the like, are prepared by copolymerizing at least one hydrocarbon conjugated diene with at least one monovinylarene hydrocarbon, preferably butadiene and styrene, to produce copolymers; hydrogenating the copolymer to produce a hydrogenated copolymer in which the double bonds attributable to the conjugated diene are saturated without substantial saturation of the aromatic double bonds; lithiating the hydrogenated copolymers; reacting the lithiated hydrogenated copolymers with substituted aminopyridines. The resulting grafted polymers are polar hydrogenated copolymers, stable, resistant to heat-deterioration, resistant to oxidated degradation, and are of a type to have significant viscosity index improving capabilities when incorporated into lubricating oils, with sufficient solubility to be formulated into the lubricating oils adequately, yet possess significant shear stability in such medium, and at the same time contributing desirable dispersant properties to the oil to provide sludge dispersing benefits.

CONJUGATED DIENE/MONOVINYLARENE COPOLYMERS

In my discussion hereinafter for simplicity and convenience I use styrene as a representative as well as the preferred monovinylarene, and butadiene as a representative as well as the preferred conjugated diene. Similarly butadiene/styrene copolymers are discussed as representative of the applicable conjugated diene/monovinylarene copolymers generally.

Conjugated diene monomers suitable for making copolymers of my invention are those aliphatic hydrocarbon dienes of four to eight carbon atoms per molecule. Exemplary dienes include butadiene, isoprene, 2,3-dimethylbutadiene, piperylene, and the like.

Monovinylarene monomers suitable for use in making copolymers of my invention are the hydrocarbon monovinylarenes of eight to fifteen carbon atoms per molecule. Exemplary monovinylarenes include styrene, 3-methylstyrene, 3,5-diethylstyrene, 4-tolylstyrene, and the like.

Exemplary copolymers include those of butadiene and styrene, isoprene and styrene, butadiene and α-methyl styrene, and isoprene and α-methyl styrene.

Suitable copolymers should contain about 20 to 80 percent by weight copolymerized styrene, the balance then being copolymerized butadiene, more preferably about 50 to 65 weight percent styrene and the balance butadiene. These copolymers presently preferably are substantially random copolymers, but can contain significant blocks of polystyrene and/or blocks of polybutadiene and/or blocks of random or random tapered butadiene/styrene. These copolymers also can be presented by such as B/A, A-B, B/A-A, and wherein A is a block of polystyrene, B is a block of polybutadiene, and B/A represents either a random copolymer block of butadiene/styrene, or a tapered block of butadiene/styrene, with the realization that B/A also can contain appreciable block structure of polystyrene. The use of the designation B/A when used with reference to tapered random blocks indicates the direction of taper with the B/A blocks, while random, gradually decreases in content of the first indicated monomer along the block, due to the mode of preparation used. The block polystyrene A content of the random block copolymer B/A-A preferably should be in the range of about 15 to 35, more preferably 15 to 25, weight percent.

The butadiene/styrene copolymers which are employed to prepare my additives should have a number average molecular weight in the approximate range of 20,000 to 300,000, presently preferred about 25,000 to 100,000. The copolymers, as far as the butadiene portion, will have a vinyl content prior to hydrogenation of about 20 to 95 weight percent, preferably about 20 to 70 weight percent. The copolymers must be of a type and molecular weight to provide significant viscosity index improving properties to the oil when so used, to have sufficient oil-solubility to be formulated into lubricating oils, and to possess significant shear stability in such oil formulations.

The copolymers of butadiene/styrene employable in accordance with my invention can be prepared by any suitable techniques known in the art.

Most typically, a mixture of butadiene and styrene monomers can be polymerized by contacting the monomers with a hydrocarbon monolithium initiator. Any of the hydrocarbon monolithium initiators known in the anionic solution polymerization arts can be employed. Typically these can be represented by RLi wherein R is a hydrocarbon radical and can be aliphatic, cycloaliphatic, or aromatic, containing at least one carbon atom per molecule. The number of carbon atoms and consequently the molecular weight of the hydrocarbon lithium initiator is not limited as far as operability is concerned, though those of up to about 20 carbon atoms are more readily available. Most frequently employed are the aliphatic monolithium types. Exemplary species include such as n-butyllithium, sec-butyllithium, n-decyllithium, phenyllithium, 1-naphthyllithium, p-tolyllithium, cyclohexyllithium, eicosyllithium, and the like. The presently preferred species are sec-butyllithium and n-butyllithium for commercial availability. If an n-alkyllithium initiator is employed, it usually is advisable to include a minimal amount of a polar compound, such as tetrahydrofuran, to increase initiator activity and efficiency. Such a polar compound may also act as a randomizer.

Such hydrocarbyl monolithium initiators are employed in an amount effective for polymerization of the monomer charge employed to the molecular weight desired. Typically, an exemplary amount of such initiator would be in the range of about 0.33 to 5 mhm, millimoles per 100 grams of monomer, presently preferred about 1 to 4 mhm, consistent with obtaining polymers of presently preferred molecular weight ranges.

Polymerization is conducted by contacting the monomer charge with the monolithium initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Suitable and exemplary temperatures lie in the range of from less than about 0° C. to over 200° C., presently preferred about 40° C. to 100° C. since these temperatures are consistent with obtaining the desired copolymers. The pressures employed can be as convenient, though preferably pressures are employed sufficient to maintain monomers and diluent substantially in the liquid phase. The polymerization times can vary widely as may be convenient, and will, of course, be affected by polymerization temperatures chosen. Time preferably should be chosen such that substantially complete conversion of monomers is obtained.

To prepare the A-B copolymeric structure, either styrene or butadiene can be first polymerized and then the other monomer added and polymerized to result in the A-B copolymer.

Alternatively, a mixture of the butadiene and styrene monomers can be copolymerized in desired proportion under randomizing conditions to produce a B/A copolymer. In another mode, a B/A structure can be first prepared by polymerizing a suitable butadiene/styrene admixture to the desired degree of conversion, and this usually will produce a tapered block since butadiene tends to polymerize somewhat faster to start with, and then subsequently additional styrene can be added to form an A block onto the first formed B/A block. Alternatively, and presently preferred, a mixture in a suitable ratio of butadiene and styrene can be copolymerized, under limited randomizing conditions, and this then permits formation of a preferred B/A-A structure since the faster polymerization of the butadiene exhausts the butadiene, and remaining styrene then block homopolymerizes.

Where a substantially random B/A portion is desired, employment of a randomizing agent can be included at the suitable stage in the polymerization, typically selected from ethers, thioethers, and amines, and others as is known in the art, typically such as tetrahydrofuran, or from the alkali metal alkoxides other than of lithium, typically such as potassium t-butoxide or amyloxide.

Randomizing agents suitable for use can be chosen from among the following and similar compounds which can be characterized as moderately active randomizers or strongly active randomizers. Among those compounds that can be generally characterized as moderately active randomizers are tetrahydrofuran and methyl ethyl ether. Randomizers that can be generally characterized as strongly active can be chosen from among 1,2-dimethoxyethane, dimethyl ether, N,N,N',N'-tetramethylethylenediamine, bis(2-methoxyethyl)ether, and 1,2-bis(2-methoxyethoxy)ethane.

In this invention strongly active randomizers are employed within the range of about 0.05 to about 5 parts per hundred monomers, preferably about 0.1 to about 2.5 parts per hundred monomers. In the process of this invention moderately active randomizers are employed within a range of about 1 to about 20 parts by weight per hundred monomers, preferably within the range of about 1.5 to about 15 parts by weight per hundred monomers.

Other randomizers of lesser activity include diethyl ether, di-n-propyl ether, di-n-octyl ether and dioxane. These compounds are less preferred in view of their comparatively low degree of randomizer activity. These less active randomizers are employed within a range of about 5 to about 100, preferably from about 10 to about 30, parts by weight per hundred parts monomers.

As is known in the art, various substances are known to be detrimental to the initiator, including such as carbon dioxide, oxygen, or water, and the like. It thus is preferable that the reactants, apparatus involved, diluents, and the like, be maintained substantially free of such materials.

HYDROGENATION

The hydrogenation procedure employed should be effective so as to substantially reduce olefinic unsaturation, including vinyl unsaturation, while leaving essentially untouched aromatic unsaturation present in the styrene-derived portion of the copolymer.

Hydrogenation can be conveniently conducted directly on the unquenched polymerization reaction admixture from the polymerization procedure described above. Alternatively, where convenient, the copolymerization can be quenched by addition of suitable amounts of a lower alcohol, water, or the like, to effectively kill active polymer-lithium species. The quenched copolymer then can be coagulated and recovered, by means known in the art, such as by steam-stripping. For hydrogenation purposes, suitable copolymers can be dissolved or redissolved in a suitable hydrocarbon solvent, such as from among those described as for polymerization diluents. Hydrogenation is accomplished by treating the suitable butadiene/styrene copolymer dissolved in such a solvent, by means known in the art for this purpose.

Particularly, favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogen catalysts include reduced nickel-kieselguhr catalyst.

Exemplary hydrogenation conditions include hydrogenation of the copolymer in a hydrocarbon diluent, and hydrogenation can be conducted, if desired, as described, in the polymerization diluent. Exemplary hydrogenation temperatures lie in the range of about 25° C. to 175° C. Pressures can range up to such as about 1,000 psig. Times can range from a few minutes such as about 30 minutes to several hours such as 4 hours or more, influenced not only by the temperature and pressure chosen, but also by the concentration of the copolymer in the diluent, since this affects the viscosity of the copolymeric solution being treated.

By effective selective hydrogenation, wherein substantially complete reduction of olefinic double bonds is obtained, the reduction of at least about 95 weight percent or more of the olefinic groups will have been obtained, and about 5 percent or less of the phenyl groups will have been hydrogenated.

Following completion of the copolymer hydrogenation step, the hydrogenation catalyst must be deactivated and removed to avoid interference in the succeeding lithiation steps. Conveniently, the total hydrogenation reaction mixture can be treated to deactivate the residual catalyst by any means known in the art. A typical procedure includes the addition of a solution of such as phosphoric acid and ammonium phosphate in such as about a 1:4 weight ratio, followed by introduction of air to convert the catalyst metals to insoluble phosphates, and removal thereof by filtration. The hydrogenated copolymer can be recovered by known methods, such as alcohol coagulation or steam stripping, dried under reduced pressure, followed by redissolving in an inert diluent, such as those described for the polymerization solvent, for the subsequent metalation and grafting procedures. Alternatively, the polymer cement, i.e., the hydrogenated copolymer still dissolved in the diluent employed, after removal of the insoluble catalyst phosphates by filtration, can be dried by conventional means and the metallation and grafting steps then conducted on the dried, i.e., water free, polymer-cement, the entire process from polymerization through grafting thus being readily adaptable to continuous operation.

Alternatively, a suitable hydrogenated copolymer of hereinbefore described characteristics can be dissolved in a suitable hydrocarbon diluent for the metallation and grafting steps in accordance with my invention.

WASHING STEP

It may be desirable to wash the polymer cement, after hydrogenation, and removal of hydrogenation catalyst residues with a dilute aqueous caustic solution. This washing step has been found helpful in removing apparent metalation poisons. The washed polymer cement then is washed with water, separated from the washing solution, e.g. by flashing, dried, and subjected to metalation.

METALATION

The hydrogenated butadiene-styrene copolymer is metalated using an organolithium composition in conjunction with a polar compound in order to introduce lithium atoms along the hydrogenated copolymeric structure.

The metalation step is carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the $R'$ is usually a saturated hydrocarbon radical of any length whatsoever, but ordinarily containing up to 20 carbon atoms, and can be an aromatic radical such as phenyl, naphthyl, tolyl, 2-methylnaphthyl, etc., or a saturated cyclic hydrocarbon radical of e.g., 5 to 7 carbon atoms, a mono-unsaturated cyclic hydrocarbon radical of e.g. 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula, $R'(Li)_x$ x is an integer of 1 to 3. Representative species include, for example: methyllithium, isopropyllithium, sec-butyllithium, n-butyllithium, t-butyllithium, n-dodecyllithium, phenyllithium, alpha- and beta-naphthyllithium, any biphenyllithium, styryllithium, benzyllithium, indenyllithium, 1-lithio-3-butene, 1-lithiocyclohexene-3, 1-lithiocyclohexene-2, 1,4-dilithiobutane, 1,4-dilithiobenzene, 1,3,5-trilithiopentane, 1,3,5-trilithiobenzene, and the like.

Lithium adducts of polynuclear aromatic hydrocarbons, such as those described in U.S. Pat. No. 3,170,903, also can be employed, for example, lithium adducts of biphenyl, naphthalene, anthracene or stilbene. Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly. Some lithium compounds can be used alone effectively, notably the menthyllithium types.

Though I do not wish to be bound by theory, it is presently believed likely that metalation occurs at a carbon to which an aromatic group is attached, or in an aromatic group, or in the event that the polymer is not completely hydrogenated, in positions allylic to residual double bonds, or in more than one of these positions. In any event, it is believed that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally ractive polymers prepared by using a lithium or even a polylithium initiator in polymerization, thus limiting the number and the location of the positions available for subsequent attachment. With the metalation procedure described herein, the extent of the lithiation will depend upon the amount of metalating agent used and/or the groups available for metalation.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(A) Chelating tertiary diamines, preferably those of the formula $(R^2)_2N-C_yH_{2y}-N(R^2)_2$ in which each $R^2$ can be the same or different straight- or branched-chain alkyl group of any chain length containing up to 20 carbon atoms or more all of which are included herein, and y can be any whole number from 2 to 10, and particularly the ethylene diamines in which all alkyl substituents are the same. These include, for example: tetramethylethylenediamine, tetraethylethylenediamine, tetradecylethylenediamine, tetraoctylhexylenediamine, tetra-(mixed alkyl) ethylene diamines, and the like.

(B) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(C) The useful bridgehead diamines include, for example, sparteine, triethylenediamine, and the like.

Tertiary monoamines such as triethylamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metallation reaction due to somewhat lower levels of incorporation of nitrogen-containing compounds onto the copolymer backbone in the subsequent grafting reaction.

The milliequivalents of lithium employed for the desired amount of lithiation generally range from such as about 5 to 95, presently preferably about 10 to 20 per hundred grams of copolymer to be modified. Generally equimolar amounts of the polar promoter and the lithium component (based on the carbon-bound lithium) will be employed. The molar ratio of active lithium to the polar promoter can vary from such as 0.01 to 1.5. There appears to be little advantage, however, in using a molar ratio above about 1:1.

In general, it is preferable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

The process of lithiation can be carried out at temperatures in the range of such as about $-70°$ C. to $+150°$ C., presently preferably in the range of about 0° C. to 100° C., the upper temperatures being limited by the thermal stability of the lithium compounds. The lower temperatures are limited by considerations of production rate, the rate of reaction becoming unreasonably slow at low temperatures. The length of time necessary to complete the lithiation and subsequent reactions is largely dependent upon the temperature. Generally the time can range from a few minutes to about 24 hours, presently preferably from about 30 l minutes to 3 hours.

The extent of lithiation desired depends on the nature of the grafted product desired. A weight percent nitrogen of from about 0.01 to 5, preferably from 0.05 to 0.5, is suitable for providing dispersancy to the butadiene-styrene copolymers which are suitable as VI improvers of my invention. The amount of lithiation required depends on the molecular weight of the backbone polymer, the molecular weight of the nitrogen-containing compound utilized in the grating reaction, and the weight percent nitrogen desired in the product polymer of my invention.

GRAFTING STEP WITH 4-SUBSTITUTED AMINOPYRIDINES

The next step in the process of preparing my novel grafted hydrogenated copolymers is the treatment of the lithiated hydrogenated copolymers, in solution, and without quenching in any manner to destroy the lithium sites, with a 4-substituted aminopyridine as hereinbefore defined.

While I do not wish to be bound by theory, I believe that the following theoretical discussion of my invention relative to a procedure described in U.S. Pat. No. 4,145,298 will be of assistance.

The general formula of grafting agents with the functional group $R^3N=HC-$ as disclosed in Col. 8, lines 27-45 and in Col. 16, lines 16-40 of U.S. Pat. No. 4,145,298 PPCO is directed to imines. Imines are condensation products of ketones and aldehydes with primary amines. Even though both imines (disclosed in U.S. Pat. No. 4,145,298) and pyridines (my invention) appear to contain a similar bonding sequence, $-HC-N=CH-$, they are quite different for the following reasons:

Imines contain the above bonding sequence in a linear chain, whereas in my pyridines said bonding sequence is part of an aromatic ring and thus more stable than in imines.

When imines react with organo-Li compounds, including Li-initiated live polymer, the $-N=C-$ double bond is broken and eventually a secondary amine is formed (See *Organic Chemistry* by R. J. and J. S. Fessender, 1979, Page 249.):

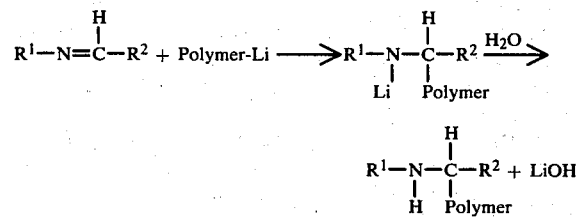

When pyridines react with Polymer-Li, the aromatic ring and the $-N=C-$ bond stay intact (See *Organic Chemistry* by R. J. and J. S. Fessender, Pg. 760):

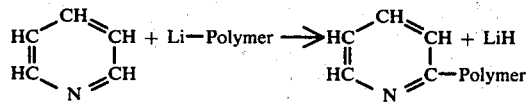

The grafting step is carried out under any suitable conditions to provide my modified copolymer having the desired nitrogen content, which I term a grafted hydrogenated copolymer. Generally, the grafting is done at an effective temperature in the range of such as about 0° C. to 100° C., for an effective time of such as about 0.01 to 10 hours, preferably using at least about one mole of suitable nitrogen-containing compound for each equivalent of copolymer lithium to insure substantially complete reaction of and utilization of the lithium. The grafting step is carried out immediately following the metalation step without prior separation or purification steps so as to preserve the lithium sites.

The modified polymer is recovered using any convenient means such as by coagulation treatment with a lower alcohol followed by filtration and any desired purification steps.

OIL COMPOSITIONS

The nitrogen-containing copolymeric compositions in accordance with my invention can be incorporated as needed into oils including lubricating and other oils using any suitable procedures.

In the preparation of lubricating compositions, various mineral oils are employed. Generally, these are of petroleum origin and are complex mixtures of many hydrocarbon compounds, though they can be derived from coal conversion, tar sands, shale oil, and the like. Preferably, the mineral oils are refined products such as are obtained by well-known refining processes, such as by hydrogenation, by polymerization, by dewaxing, etc. Frequently, the oils have a Saybolt viscosity at 100° F. in the range of about 60 to 5,000, and a Saybolt viscosity at 210° F. of about 30 to 250. The oils can be of paraffinic, naphthenic, or aromatic types, as well as mixtures of two or more types. However, the additives of my invention have special advantages when employed with paraffinic types of oils such as are obtained by solvent extraction of a suitable refinery stream. Many suitable lubricating compositions are available as commercial products, such as those used as motor oils, gear oils, automatic transmission oils, and the like.

In addition to the additives of this invention, the lubricating compositions can comprise one or more of other additives known to those skilled in the art, such as antioxidants, pour-point depressants, dyes, detergents, etc. Examples of these additives are the metal petroleum sulfonates, zinc dialkyldithiophosphates, alkyl succinimides, and the like. To be of commercial interest as a motor oil, the lubricating composition generally preferably presently should have a viscosity index of at least about 130.

My unique nitrogen-containing compolymers find application in use in lubricating oils, automatic transmission fluids, tractor hydraulic fluids, industrial hydraulic oils, aviation oils, and the like, in any broad effective range. A suggested broad amount is in the range of such as about 0.5 to 10 volume percent. For most usages, the presently preferred range is about 0.5 to 5 volume percent in motor oils, and similarly in industrial hydraulic fluids. Typical usages anticipated in specific applications are about 3 to 5, preferably about 3.75, volume percent in automotive transmission fluids, about 1 to 3, preferably about 2, volume percent in industrial hydraulic fluids, about 1 to 3, preferably about 1.3, volume percent in tractor hydraulic fluids, about 8 to 9 volume percent in aviation oils, and about 1 to 3, preferably about 2, volume percent in motor oils.

EXAMPLES

Examples provided are intended to further an understanding of my invention, without limiting the scope thereof. Particular species employed, particular conditions, amounts of materials, and the like, are to be considered exemplary, are directed to one skilled in the art, and are not intended to be limitative of the reasonable scope of my invention.

EXAMPLE I

Preparation and Properties

This run illustrates the use of 4-dimethylaminopyridine for the preparation of a viscosity index improver (VII) having effective dispersant properties in accordance with my invention.

A commercial Phil-Ad ® VII (a hydrogenated 41/59 butadiene/styrene copolymer produced in accordance with the disclosure of U.S. Pat. No. 3,554,911) was treated according to Recipe I:

| Recipe I | |
|---|---|
| Phil-Ad VII, parts by weight: | 100 |
| Cyclohexane, parts by weight: | 1000 |
| Tetramethylethylene diamine, mph[a]: | 20 |
| n-butyllithium, mph[a]: | 20 |
| Temperature, degrees C.: | 70 |

-continued

| Recipe I | |
|---|---|
| Time, hours: | 1.5 |

[a] mph = gram millimoles per 100 grams of polymer

The metalation with n-butyllithium was carried out employing essentially anhydrous agents and conditions under an inert nitrogen atmosphere. After cooling to 50 degrees C., 22.0 mph of 4-dimethylaminopyridine (Reilly Chemicals) were added, mixed thoroughly, and the mixture kept at 50 degrees C. for one hour. The resulting mixture of grafted copolymer was terminated with isopropyl alcohol, filtered, and purified by three successive dissolutions in cyclohexane and coagulations in ethanol. The modified copolymer was dried under vacuum conditions.

Two oil solutions were prepared containing the 4-dimethylaminopyridine-grafted VI improver polymer in a premium motor oil as shown in Formulation I:

| Formulation I | |
|---|---|
| Kansas City 10-Stock Oil[a] | 63.4% |
| Kansas City 20-Stock Oil[b] | 20.43% |
| Phil-Ad 100 Solution[c] | 1.25% |
| Lubrizol 1395[d] | 0.61% |
| Exxon ECA 5118 solution[e] | 0.60% |
| Dispersant VII (Invention) | 0.15% |

[a] a commercially available paraffinic lubricating oil (Phillips Petroleum Company) having a viscosity of approximately 100 SUS at 100 degrees F.
[b] a commercially available paraffinic lubricating oil of (Phillips Petroleum Company) having a viscosity of approximately 330 SUS at 100 degrees F.
[c] a 50 vol-% solution of a commercially available overbased calcium petroleum sulfonate detergent in Kansas City 10-Stock oil.
[d] a commercially available zinc dialkyldithiophosphate antioxidant and antiwear agent.
[e] a 50 vol-% solution in Kansas City 10-Stock oil of a commercially available pour point depressant.

Viscosity, viscosity index and pour point of the two oil solutions are given in Table I:

TABLE I

| | Run 1 Polymer A | Run 2 Polymer B |
|---|---|---|
| N-Content in Polymer[a], weight % | 0.31 | 0.24 |
| Polymer Concentration in Oil, weight % | 2.34 | 2.4 |
| Viscosity at 40 degrees C., SUS[b] | 351 | 387 |
| Viscosity at 100 degrees C., SUS[b] | 71.7 | 72.3 |
| Viscosity Index[c] | 182 | 166 |
| Pour Point[d], degrees F. | −35 | −35 |
| Sonic Shear[e] | 0.5 | — |

[a] Nitrogen content was determined with an Antek Nitrogen Analyzer, by complete pyrolysis of about 2 to 8 mh of the N-containing sample to nitric oxide, and subsequently reacting the formed nitric oxide with ozone to metastable nitrogen dioxide, which emits chemiluminescent radiation upon relaxation. The intensity of the chemiluminescence is determined by means of a photomultiplier and is a measure of the nitrogen content of the test sample.
[b] Determined according to ASTM D455-74
[c] Determined according to ASTM D2270-75
[d] Determined according to ASTM D97-66
[e] The SUS viscosity at 100 degrees C. of a 2.0 weight-% solution of polymer in a base oil is determined before and after subjecting the solution for 6.5 minutes at 38 degrees C. jacket temperature to a Raytheon Model DF-101 sonic oscillator operated at 10 kilocycles per second.

The data above, particularly the Visocsity Index, Pour Point and Sonic Shear, demonstrate the highly effective and useful properties of my VII copolymers prepared with a 4-substituted aminopyridine.

EXAMPLE II

Screening Tests

This run illustrates the effectiveness of my grafted copolymer as a multiple purpose additive, both as a VI improver, and as an ashless detergent.

A laboratory bench-scale test, referred to as the "carbon spot test" and generally described in U.S. Pat. No. 3,401,117, was used as a preliminary test for dispersancy. This test entails stirring 50 mL of carbon black into 10 grams of SAE 10 lubricating oil base stock containing 4% of the additive to be tested. A drop of the resulting slurry is dropped onto a polished, stainless steel block heated to 500 degrees F. (260 degrees C.). The extent to which the carbon black is carried to the extremity of the resulting oil ring is a measure of the dispersancy of the additive. An arbitrary scale of 1 to 6 designating very poor to excellent is used for rating. Carbon black in oil without the additives is given a 1 rating, while oil containing Lubrizol 925, a commercially available alkyl succinimide, has a 6 rating.

Using this test, the oil containing my inventive 4-dimethylaminopyridine-grafted polymers A and B of Example I Table I was given a 4 rating, showing good effectiveness.

Another bench scale dispersancy test was carried out as follows: 4 grams of the polymer prepared in Example I were dissolved in 96 grams of n-decane. To this solution 3 mL of an engine sludge obtained from an engine oil run without a dispersant were added to the solution. The test mixture was agitated for 24 hours at 70 degrees C. The bottle was allowed to cool and a sample was poured into a vial. Percent light trasmittance through the suspension was measured at time=0, 24 hours, and 48 hours, by using a Brinkman, PC/1000 colorimeter at 545μ, a fiber optic light guide length: 30 inches, and a stainless steel probe (effective cell thickness: 2 cm). The change in transmittance over a period time is indicative of the dispersing ability of the test VII.

Change in transmittance was 0.2 after 24 hours and 0.4 after 48 hours for Polymer A, and 0.1 after 24 hours and 0.2 after 48 hours for Polymer B, showing good dispersancy.

EXAMPLE III

Engine Tests

My modified Polymer A of Example I was further evaluated for dispersant properties in a Ford Sequence V-C varnish engine test as described in ASTM Special Technical Publication 315 F.

My modified copolymer was blended into a premium motor oil formulation as a replacement for both the typical VI improver and the ashless sludge dispersant. The test oil formulation was as follows:

| Formulation II | |
|---|---|
| Kansas City 10-Stock | 57.03% |
| Kansas City 20-Stock | 25.0% |
| Phil-Ad 100 Solution | 14.0% |
| Lubrizol 1395 | 1.22% |
| Exxon ECA 5118 Solution | 0.60% |
| Dispersant VII (invention) | 2.15% |

Results from Sequence V-C Engine Tests are given in Table II:

TABLE II

Sequence V-C Engine Test

| | Run 3 Inventive Dispersant VII (Polymer A) | Limits Considered Acceptable for Commercial Formulations |
|---|---|---|
| Average Engine Sludge | 9.6 | 8.5 |
| Average Piston Skirt Varnish | 8.8 | 7.9 |
| Average Engine Varnish | 9.0 | 8.0 |
| Oil Screen Clogging, % | 0.0 | 5 |
| Oil Ring Clogging, % | 0.0 | 5 |
| No. Stuck Compression Rings | 0.0 | 0.0 |

These data show that my 4-dimethylaminopyridine modified copolymer provides dispersant properties equivalent to or better than those considered presently acceptable for commercial dispersants.

EXAMPLE IV

This run demonstrates that grafting of Phil-Ad ® VII with 4-dimethylaminopyridine (4-DMAP; marketed by Aldrich Chemical Co., designated Aldrich 122867) is much more effective than the corresponding grafting with 2-dimethylaminopyridine (2-DMAP; marketed by Aldrich Chemical Co., designated Aldrich 0410TE). The two grafting reactions were carried out according to the following recipe and conditions:

| Recipe II | | |
|---|---|---|
| A. | metallation Step: | |
| | Phil-Ad ® VII, parts by wt. | 100 |
| | Cyclohexane, parts by wt. | 1000 |
| | Tetramethylethylenediamine, mph | Variable |
| | n-Butyllithium, mph | Variable |
| | Temperature, degrees C. | 70 |
| | Time, hours | 1.5 |
| B. | Grafting Step: | |
| | DMAP, mph | Variable |
| | Temperature, degrees C. | 50 |
| | Time, hours | 1.0 |

Additional details regarding the synthesis of dimethylaminopyridine-grafted VII and pertinent analytical and dispersancy data are listed in Table III.

TABLE III

| Run | NBL[a] mhp | TMEDA[b] mhp | Grafting Agent[c] Type | mhp | Carbon[d] Spot Rating | Nitrogen[e] Content ppm |
|---|---|---|---|---|---|---|
| 4 (Control) | 5.0 | 5.0 | 2-DMAP | 5.5 | 3 | 34 |
| 5 (Invention) | 5.0 | 5.0 | 4-DMAP | 5.5 | 4+ | 365 |
| 6 (Control) | 10.0 | 10.0 | 2-DMAP | 10.1 | 3 | 181 |
| 7 (Invention) | 10.0 | 10.0 | 4-DMAP | 10.1 | 4 | 962 |
| 8 (Control) | 15.0 | 15.0 | 2-DMAP | 16.5 | 3 | 349 |
| 9 (Invention) | 15.0 | 15.0 | 4-DMAP | 16.5 | 4 | 1445 |
| 10 (Control) | 20.0 | 20.0 | 2-DMAP | 22.0 | 3 | 506 |
| 11 (Invention) | 20.0 | 20.0 | 4-DMAP | 22.0 | 4 | 1789 |
| 12 (Control) | 25.0 | 25.0 | 2-DMAP | 27.5 | 3 | 645 |
| 13 (Invention) | 25.0 | 25.0 | 4-DMAP | 27.5 | 4 | 2091 |

[a]n-butyllithium
[b]Tetramethylethylenediamine
[c]2-DMAP is 2-dimethylaminopyridine; 4-DMAP is 4-dimethylaminoprydine
[d]Determined in accordance with the procedure described in Example II
[e]Determined according to the procedure described in footnote[a] of Table I.

Data in Table III clearly demonstrate that grafting of viscosity index improver copolymer with 4-dimethylaminopyridine resulted in unexpectedly higher nitrogen content and consistently better dispersant properties of the resulting copolymer (Runs 5, 7, 9, 11, and 13) than grafting with 2-dimethylaminopyridine at the same reaction conditions (Runs 4, 6, 8, 10, and 12).

The disclosure, including data, has illustrated the value and effectiveness of my invention. The examples, the knowledge and background of the field of the invention and of general principles of chemistry and other applicable sciences, have formed the bases to which the broad descriptions of the invention, including the ranges of conditions and generic groups of operant components have been developed and further together have formed the bases for my claims here appended.

I claim:

1. Shear-stable, oil-based composition, comprising a major amount of an oil selected from mineral oils and synthetic oils, and a minor effective viscosity index improving amount of an oil soluble organo nitrogen compound grafted hydrogenated conjugated diene/monovinylarene copolymer dissolved therein, said copolymer prepared by the process which comprises lithiating a hydrogenated conjugated diene hydrocarbon/monovinylarene hydrocarbon copolymer, and reacting the resulting lithiated hydrogenated copolymer with effective amounts of a 4-substituted aminopyridine, thereby preparing said grafted copolymer.

2. The composition of claim 1 wherein said 4-substituted aminopyridine is represented by

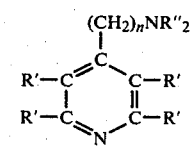

wherein each R' individually represents any of hydrogen, or hydrocarboneous aliphatic, cycloaliphatic, or aromatic radicals, or combinations thereof; each R" individually represents any of hydrocarboneous aliphatic, cycloaliphatic, or aromatic radicals, or combinations thereof; n is zero or a whole number of 1 to 6; such that R' when other than hydrogen and R" each contain 1 to 12 carbon atoms.

3. A composition according to claim 1 wherein the nitrogen-containing grafted copolymer has a number average molecular weight in the range of about 20,000 to 300,000, a vinyl content prior to hydrogenation of about 20 to 95 weight percent, a copolymerized monovinylarene content of 20 to 80 weight percent, and a nitrogen content of about 0.01 to 5 weight percent.

4. A composition according to claim 3 wherein said grafted copolymer has a number average molecular weight in the range of about 25,000 to 100,000, a copolymerized monovinylarene content of 50 to 65 weight percent, and a vinyl content prior to hydrogenation of about 20 to 70 weight percent.

5. A composition according to claim 4 wherein the mineral oil is a lubricating oil and has a viscosity at 210° F. in the range of about 30 to 250 SUS, and said organonitrogen compound grafted hydrogenated copolymer exhibits a nitrogen content in the range of about 0.05 to 0.5 weight percent.

6. A composition according to claim 5 wherein said grafted copolymer is employed in an amount in the range of about 0.5 to 10 volume percent relative to the total oil excluding other additives.

7. A composition according to claim 6 wherein said nitrogen-containing compound is selected from the group consisting of 4-dimethylaminopyridine, 4-diethylaminopyridine, 4-dipropylaminopyridine, 4-(N-dimethylamino-methyl)pyridine, 4-(N-diethylamino-methyl)pyridine, 4-(N-dimethylamino-ethyl)pyridine, and 4-(N-diethylamino-ethyl)pyridine.

8. A composition according to claim 7 wherein said copolymer is a copolymer of butadiene and styrene, isoprene and styrene, butadiene and α-methylstyrene, or isoprene and α-methylstyrene.

9. The composition according to claim 8 wherein said hydrogenated copolymer is a 41/59 weight percent hydrogenated butadiene/styrene block copolymer having a block styrene content of about 20 weight percent, and said nitrogen-containing compound is 4-dimethylaminopyridine.

10. The composition of claim 1 wherein said copolymer is selected from copolymers represented by B/A, B/A-A, A-B, and mixtures, wherein B/A represents a randomized block of conjugated diene/monovinylarene, which can be tapered, A represents homopolymeric block of polymerized monovinylarene, and B represents a block of homopolymerized polyconjugated diene.

11. The composition of claim 1 wherein said copolymer contains a random block B/A, and wherein the block polystyrene content is in the range of about 15 to 25 weight percent.

12. The composition of claim 1 wherein said base oil is a lubricating oil having a minimum VI of about 130, wherein said grafted copolymer is employed in an amount of about 0.5 to 5 volume percent relative to the base oil.

13. The composition of claim 1 wherein said base oil is an automotive transmission fluid wherein said grafted copolymer is employed in an amount of about 3 to 5 volume percent.

14. The composition of claim 1 wherein said base oil is an aviation oil wherein said grafted copolymer is employed in an amount of about 8 to 9 volume percent.

15. An oil soluble organo nitrogen compound grafted hydrogenated conjugated diene/monovinylarene copolymer,
said copolymer prepared by the process which comprises lithiating a hydrogenated conjugated diene hydrocarbon/monovinylarene hydrocarbon copolymer, and reacting the resulting lithiated hydrogenated copolymer with effective amounts of a 4-substituted aminopyridine, thereby preparing said grafted copolymer.

16. The copolymer of claim 15 wherein said 4-substituted aminopyridine is represented by

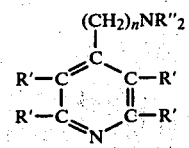

wherein each R' individually represents any of hydrogen, or hydrocarbonous aliphatic, cycloaliphatic, or aromatic radicals, or combinations thereof; each R" individually represents any of hydrocarbonous aliphatic, cycloaliphatic, or aromatic radicals, or combinations thereof; n is zero or a whole number of 1 to 6; such that R' when other than hydrogen and R" each contain 1 to 12 carbon atoms.

17. A copolymer according to claim 15 wherein said nitrogen-containing grafted copolymer has a number average molecular weight in the range of about 20,000 to 300,000, a vinyl content prior to hydrogenation of about 20 to 95 weight percent, a copolymerized monovinylarene content of 20 to 80 weight percent, and a nitrogen content of about 0.01 to 5 weight percent.

18. A copolymer according to claim 17 wherein said grafted copolymer has a number average molecular weight in the range of about 25,000 to 100,000, a copolymerized monovinylarene content of 50 to 65 weight percent, and a vinyl content prior to hydrogenation of about 20 to 70 weight percent.

19. A copolymer according to claim 4 wherein said organonitrogen compound grafted hydrogenated copolymer exhibits a nitrogen content in the range of about 0.05 to 0.5 weight percent.

20. A copolymer according to claim 15 wherein said nitrogen-containing compound is selected from the group consisting of 4-dimethylaminopyridine, 4-diethylaminopyridine, 4-dipropylaminopyridine, 4-(N-dimethylamino-methyl)pyridine, 4-(N-diethylamino-methyl)pyridine, 4-(N-dimethylamino-ethyl)pyridine, and 4-(N-diethylamino-ethyl)pyridine.

21. A copolymer according to claim 20 wherein said copolymer is a copolymer of butadiene and styrene, isoprene and styrene, butadiene and α-methylstyrene, or isoprene and α-methylstyrene.

22. The copolymer according to claim 19 wherein said hydrogenated copolymer is a 41/59 weight percent hydrogenated butadiene/styrene block copolymer having a block styrene content of about 20 weight percent, and said nitrogen-containing compound is 4-dimethylaminopyridine.

23. The copolymer of claim 15 wherein said copolymer is selected from copolymers represented by B/A, B/A-A, A-B, and mixtures, wherein B/A represents a randomized block of conjugated diene/monovinylarene, which can be tapered, A represents homopolymeric block of polymerized monovinylarene, and B represents a block of homopolymerized polyconjugated diene.

24. The copolymer of claim 15 wherein said copolymer contains a random block B/A, and wherein the block polystyrene content is in the range of about 15 to 25 weight percent.

25. A process of preparing an oil soluble organo nitrogen compound grafted hydrogenated conjugated diene/monovinylarene copolymer which comprises metalating a hydrogenated conjugated diene hydrocarbon/monovinylarene hydrocarbon copolymer, and reacting the resulting metalated hydrogenated copolymer with effective amounts of a 4-substituted aminopyridine, thereby preparing said grafted copolymer.

26. The process of claim 25 wherein said 4-substituted aminopyridine is represented by

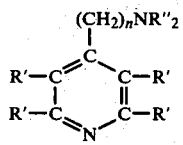

wherein each R' individually represents any of hydrogen, or hydrocarbonous aliphatic, cycloaliphatic, or aromatic radicals, or combinations thereof; each R" individually represents any of hydrocarbonous aliphatic,, cycloaliphatic, or aromatic radicals, or combinations thereof; n is zero or a whole number of 1 to 6; such that R' when other than hydrogen and R" each contain 1 to 12 carbon atoms.

27. A process according to claim 26 wherein the resulting nitrogen-containing grafted copolymer exhibits a number average molecular weight in the range of about 20,000 to 300,000 a vinyl content prior to hydrogenation of about 20 to 95 weight percent, a copolymerized monovinylarene content of 20 to 80 weight percent, and a nitrogen content of about 0.01 to 5 weight percent.

28. A process according to claim 27 wherein the resulting nitrogen-containing grafted copolymer exhibits a number average molecular weight in the range of about 25,000 to 100,000, a copolymerized monovinylarene content of 50 to 65 weight percent, and a vinyl content prior to hydrogenation of about 20 to 70 weight percent.

29. A process according to claim 28 wherein said organonitrogen compound grafted hydrogenated copolymer exhibits a nitrogen content in the range of about 0.05 to 0.5 weight percent.

30. A process according to claim 25 or 27 wherein said nitrogen-containing compound is selected from the group consisting of 4-dimethylaminopyridine, 4-diethylaminopyridine, 4-dipropylaminopyridine, 4-(N-dimethylamino-methyl)pyridine, 4-(N-diethylamino-methyl)pyridine, 4-(N-dimethylamino-ethyl)pyridine, and 4-(N-diethylamino-ethyl)pyridine.

31. A process according to claim 30 wherein said copolymer is a copolymer of butadiene and styrene, isoprene and styrene, butadiene and α-methylstyrene, or isoprene and α-methylstyrene.

32. The process according to claim 27 wherein said hydrogenated copolymer is a 41/59 weight percent hydrogenated butadiene/styrene block copolymer having a block styrene content of about 20 weight percent, and said nitrogen-containing compound is 4-dimethylaminopyridine.

33. The process of claim 25 wherein said copolymer is selected from copolymers represented by B/A, B/A-A, A-B, and mixtures, wherein B/A represents a randomized block of conjugated diene/monovinylarene, which can be tapered, A represents homopolymeric block of polymerized monovinylarene, and B represents a block of homopolymerized polyconjugated diene.

34. The process of claim 25 wherein said copolymer contains a random block B/A, and wherein the block polystyrene content is in the range of about 15 to 25 weight percent.

* * * * *